(12) United States Patent
Friedrichs

(10) Patent No.: US 12,428,007 B2
(45) Date of Patent: Sep. 30, 2025

(54) ACTIVE LEARNING ON FALLBACK DATA

(71) Applicant: Woven by Toyota, Inc., Tokyo (JP)

(72) Inventor: Jasper Friedrichs, Menlo Park, CA (US)

(73) Assignee: Woven by Toyota, Inc., Tokyo (JP)

(*) Notice: Subject to any disclaimer, the term of this patent is extended or adjusted under 35 U.S.C. 154(b) by 207 days.

(21) Appl. No.: 17/977,505

(22) Filed: Oct. 31, 2022

(65) Prior Publication Data

US 2024/0140453 A1    May 2, 2024

(51) Int. Cl.
*B60W 50/06* (2006.01)
*B60W 50/02* (2012.01)
*B60W 60/00* (2020.01)
*G05B 13/02* (2006.01)

(52) U.S. Cl.
CPC ........ *B60W 50/06* (2013.01); *B60W 50/0205* (2013.01); *B60W 50/0225* (2013.01); *B60W 60/0015* (2020.02); *G05B 13/0265* (2013.01)

(58) Field of Classification Search
CPC ............. B60W 50/06; B60W 50/0205; B60W 50/0225; B60W 60/0015; B60W 60/00; G05B 13/0265
See application file for complete search history.

(56) References Cited

U.S. PATENT DOCUMENTS

| | | | | |
|---|---|---|---|---|
| 2018/0018571 A1* | 1/2018 | Schwartz | ................ | G06N 5/02 |
| 2019/0318235 A1* | 10/2019 | Stepp | ...................... | G06N 3/08 |
| 2021/0276547 A1* | 9/2021 | Narayanan | ........ | B60W 30/0956 |
| 2021/0403035 A1 | 12/2021 | Danna et al. | | |
| 2022/0405537 A1* | 12/2022 | Yang | ..................... | G06F 18/256 |
| 2024/0070449 A1* | 2/2024 | Fathony | ................... | G06N 3/08 |
| 2024/0101130 A1* | 3/2024 | Harihara Gupta | ........................... | B60W 50/0225 |
| 2024/0132083 A1* | 4/2024 | Kalva | ..................... | G06F 11/36 |
| 2024/0133694 A1* | 4/2024 | Jung | ....................... | G06N 3/08 |

FOREIGN PATENT DOCUMENTS

| | | |
|---|---|---|
| CN | 103529822 B | 4/2016 |
| CN | 109884916 A | 6/2019 |
| EP | 3958080 A1 | 2/2022 |
| WO | 2016064898 A1 | 4/2016 |
| WO | 2019106664 A1 | 6/2019 |

\* cited by examiner

*Primary Examiner* — Richard M Camby
(74) *Attorney, Agent, or Firm* — Dinsmore & Shohl LLP

(57) ABSTRACT

A system for refining a trained autonomous control model is disclosed. The system includes a computing device configured to execute a simulation of a trained autonomous control model for a vehicle model in a simulation environment based on a predefined dataset defining a virtual driving environment and implement a fallback layer configured to detect a failure. In response to the fallback layer detecting the failure of the trained autonomous control model under simulation, the computing device is configured to identify an event in the simulation environment corresponding to the failure of the trained autonomous control model, select additional training data from a data corpus, the additional training data is analogous to the event, and execute a training process to refine the trained autonomous control model using the additional training data such that the trained autonomous control model learns to handle the event with fewer failures.

20 Claims, 4 Drawing Sheets

ACTIVE LEARNING ON FALLBACK DATA

TECHNICAL FIELD

The present disclosure relates to systems, methods, and computer implemented programs for refining a trained autonomous control model and, more specifically, to systems, methods, and computer implemented programs that utilize simulations to validate the performance of the trained autonomous control model and execute additional training processes for the trained autonomous control model based on the simulated performance.

BACKGROUND

Autonomous and semi-autonomous control models enable human-based operations to function with little to no human intervention for extended periods in an uncertain or contested environment. Applications of autonomous and semi-autonomous control models can be found in consumer, military, industrial, civil, and space applications. Autonomous and semi-autonomous control system implemented in vehicles is an example of a consumer based application. Autonomous and semi-autonomous control systems replace or nearly-replace the need for human decisions and control with trained autonomous and semi-autonomous control models. Trained autonomous and semi-autonomous control models ingest input data, process the input data, and output a variety of outputs such as motion plans and/or control commands for controlling elements of a device such as a vehicle.

However, before autonomous and semi-autonomous control models can be implemented, they need to be trained. That is, many autonomous and semi-autonomous control models include some form of artificial intelligence in order to process input data and generate outputs. For example, autonomous and semi-autonomous control models can be machine-learning type models. Training of autonomous and semi-autonomous control models includes selecting datasets relevant to the tasks the model is desired to process and feeding those through a training architecture including the model such that the model converges on acceptable outputs and/or predictions for the implementation by the autonomous and semi-autonomous control system. However, training is generally conducted in an indiscriminate way and difficult arises in validating and refining a trained model's operation under specific scenarios.

Accordingly, a need exists for techniques that refine a trained autonomous control model such that performance of the trained autonomous control model under particular environments and situations is improved.

SUMMARY

In an embodiment, a system for refining a trained autonomous control model includes a computing device configured to execute a simulation of a trained autonomous control model for a vehicle model in a simulation environment based on a predefined dataset defining a virtual driving environment and implement a fallback layer configured to detect a failure of the trained autonomous control model under simulation. In response to the fallback layer detecting the failure of the trained autonomous control model under simulation, the computing device is configured to identify an event in the simulation environment corresponding to the failure of the trained autonomous control model, select additional training data from a data corpus, the additional training data is analogous to the event, and execute a training process to refine the trained autonomous control model using the additional training data such that the trained autonomous control model learns to handle the event with fewer failures.

In some embodiments, a method for refining a trained autonomous control model includes executing, with a computing device, a simulation of a trained autonomous control model for a vehicle model in a simulation environment based on a predefined dataset defining a virtual driving environment and implementing, with the computing device, a fallback layer configured to detect a failure of the trained autonomous control model under simulation. In response to the fallback layer detecting the failure of the trained autonomous control model under simulation, identifying an event in the simulation environment corresponding to the failure of the trained autonomous control model, selecting additional training data from a data corpus, the additional training data is analogous to the event, and executing a training process to refine the trained autonomous control model using the additional training data such that the trained autonomous control model learns to handle the event with fewer failures.

In some embodiments, a non-transitory computer-readable storage medium storing instructions that, when executed by a processor of a computing device, cause the computing device to execute a simulation of a trained autonomous control model for a vehicle model in a simulation environment based on a predefined dataset defining a virtual driving environment and detect a failure of the trained autonomous control model under simulation. In response to detecting the failure of the trained autonomous control model under simulation, identify an event in the simulation environment corresponding to the failure of the trained autonomous control model, select additional training data from a data corpus, the additional training data is analogous to the event, and execute a training process to refine the trained autonomous control model using the additional training data such that the trained autonomous control model learns to handle the event with fewer failures.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
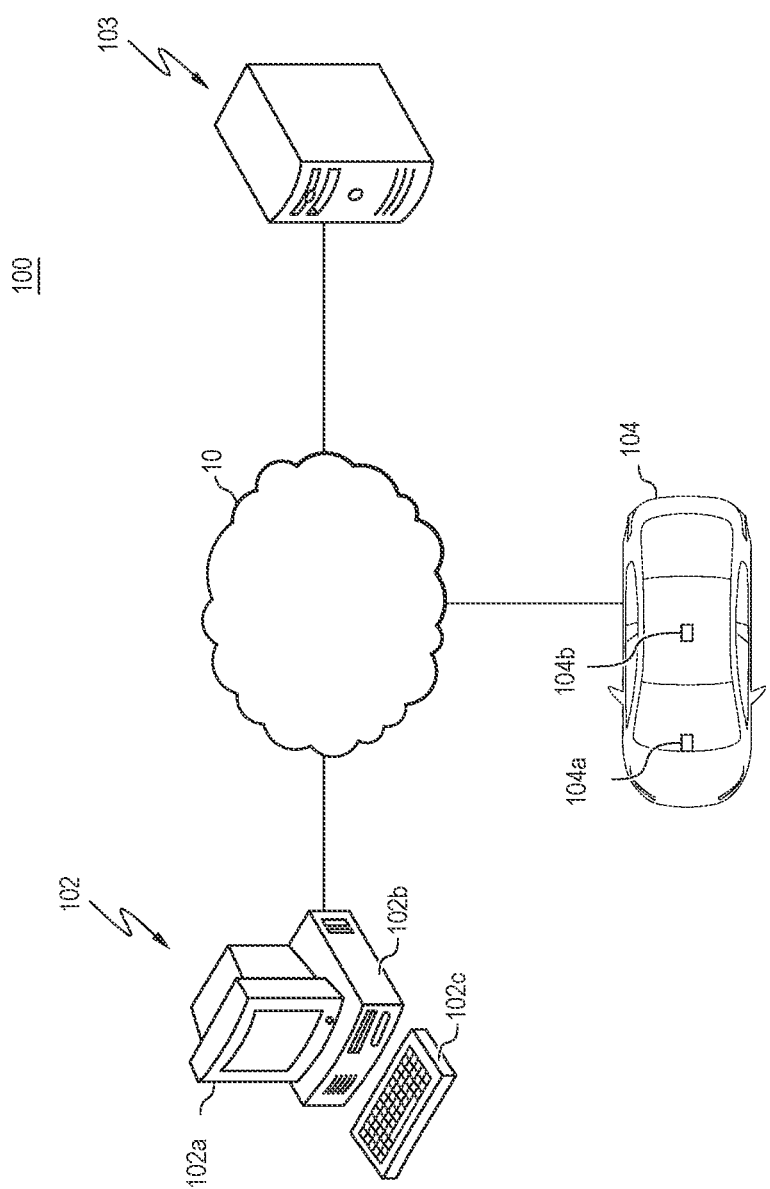
FIG. 1 schematically depicts an illustrative system, according to one or more embodiments shown and described herein.

Embodiments of the present disclosure include systems, methods, and computer implemented programs for refining a trained autonomous control model. The systems, methods, and computer implemented programs that utilize simulations to validate the performance of the trained autonomous control model and execute additional training processes for the trained autonomous control model based on the simulated performance.

The systems and methods enable improved training of autonomous control systems, such as autonomous vehicle control systems. Improved training is enabled by identifying where a learned model implemented by the autonomous control system performs poorly and selecting from a large amount of training data a subset of data that when used for training or refining the model improves the performance of the model for identified instances where the model performs poorly.

The embodiments leverage a fallback layer such as a supervising system that is configured to monitor and optionally supersede the performance of an autonomous control system implementing a learned model. The fallback layer can identify when the trained autonomous control model does not preform or respond well, for example, in a manner that is inconsistent with one or more predefined conditions. For example, the one or more predefined conditions include staying in a lane of travel, maintaining a gap distance, avoiding a collision with an object in the virtual driving environment, a rule of a road, a vehicle maneuver that exceeds a specified operating function of the virtual vehicle, and/or the like. In some embodiments, the one or more predefined conditions may be learned from datasets of driving events generated from human driving behavior.

Embodiments of the present disclosure include a system having a training architecture and a simulation environment. The simulation environment is configured to implement a virtual vehicle defined by a vehicle model having a trained autonomous control model. The trained autonomous control model is a learned model trained to perform one or more operations such as control the operation and navigation of a vehicle in an environment. The simulation environment further includes an implementation of a fallback layer configured to assess the performance of the trained autonomous control model. For example, the fallback layer may include a predefined set of rules and a prediction engine that receives as an input signals corresponding to actions generated by the trained autonomous control model that will performed or are being performed by the automated control system. The fallback layer identifies and/or predicts instances where the trained autonomous control model generates a motion trajectory and/or control commands that define an action that violates a rule, such as provoking a collision or a close call with another vehicle or object, an event of emergency braking, or the like.

The simulation environment generates inputs generated from a predefined dataset defining the virtual driving environment into the trained autonomous control model for the vehicle model. The inputs may include signals corresponding to sensor detections and the like from which the trained autonomous control model generates responsive actions. The responsive actions are monitored by the fallback layer. The simulation and/or the fallback layer can also provide the correct responsive actions, for example, actions recorded from a good human driver. It is noted that perception of trained autonomous control model is configured to be flawless in the simulation, because how the trained autonomous control model responds to simulated inputs of real-world events is the focus of the fallback layer.

In embodiments, when the fallback layer detects poor performance of the trained autonomous control model, the event or events leading into the action defined or performed by the trained autonomous control model are flagged. A data snippet capturing both the trained autonomous control model inputs as well as the correct responsive actions is curated around any flagged events and added to a data corpus. The system may search a data corpus of predefined datasets defining virtual driving environment to identify analogous additional predefined datasets. The additional datasets are then utilized to further refine the trained autonomous control model so that the trained autonomous control model may learn to handle similar situations and/or events in a manner that does not require or requires less influence from a fallback layer. In other words, additional training (e.g., refining) of the trained autonomous control model seeks to improve the trained autonomous control model such that it may behave in a more analogous manner to how good human drivers may handle the event or driving situation.

In some embodiments, the fallback layer may be a system that is configured to supersede an action of the trained autonomous control model such as applying an emergency braking operation, or correction to steering to keep the vehicle in a lane, an adjustment to the speed of the vehicle, or the like. The event of the fallback layer identifying a failure of the trained autonomous control model or implementing a superseding action causes a flag to be set identifying an instance where the trained autonomous control model performed poorly.

As described in more detail herein, systems and methods for refining a trained autonomous control model utilize a simulation and fallback layer configured to supervise the performance of the trained autonomous control model in simulated environments to identify when the trained autonomous control model preforms poorly. The identified events leading to poor performance are subsequently used to select additional training data for refining the trained autonomous control model. As autonomous control models are expected to operate in more and more complex situations and the variety of situations become more varied, the ability to perfect training of the autonomous control models becomes more challenging. The embodiments described herein provide techniques for efficiently identifying performance gaps in trained autonomous control models through simulations and providing techniques for refining the training of the trained autonomous control model.

Turning now to the drawings, the systems, methods, and computer implemented programs for refining a trained autonomous control model are now described. The following will now describe these systems and methods in more detail with reference to the drawings where like number refer to like structures.

Referring to FIG. 1, an illustrative embodiment of a system 100 for generating training data, simulating a trained autonomous control model, and refining the trained autonomous control model is depicted. The system 100 depicted in FIG. 1 includes a computing device 102, a server 103, and a vehicle 104 connected to each other via a network 10. As illustrated in FIG. 1, the network 10 may include a wide area network, such as the internet, a local area network (LAN), a mobile communications network, a public service telephone network (PSTN) and/or other network and may be configured to electronically connect a computing device 102, a server 103, and/or a vehicle 104.

The computing device 102 may include a display 102a, a processing unit 102b and an input device 102c, each of which may be communicatively coupled to together and/or to the network 10. The server 103 may be configured to include similar components as the computing device 102. As described in more detail herein, the computing device 102 and/or the server 103 are configured to simulate the operation of a trained autonomous control model and carry out refinement training of the trained autonomous control model. More specifically, the computing device 102 may be configured to perform simulations of the trained autonomous control model based on data stored and/or provided by the server 103. The server 103 may also be configured to perform operations described herein with reference to the computing device 102.

It should be understood that while the computing device 102, the server 103, and the electronic control unit 104a (also referred to herein as the vehicle ECU) of the vehicle 104 may be a personal computer, a micro controller, or the like. Additionally, while each of the computing devices illustrated in FIG. 1 are depicted as single pieces of hardware, this is also an example. More specifically, each of the computing device 102, the server 103, and electronic control unit 104a may represent a plurality of computers, servers, databases, and the like.

The vehicle 104 includes an electronic control unit 104a and a communications unit 104b. The electronic control unit 104a may be any device or combination of components comprising a processor and non-transitory computer readable memory. The processor may be any device capable of executing the machine-readable instruction set stored in the non-transitory computer readable memory. Accordingly, the processor may be an electric controller, an integrated circuit, a microchip, a computer, or any other computing device. The processor is communicatively coupled to the other components of the vehicle 104 by a communication bus. Accordingly, the communication bus may communicatively couple any number of processors with one another, and allow the components coupled to the communication bus to operate in a distributed computing environment. Specifically, each of the components may operate as a node that may send and/or receive data. It is further noted that the processor may comprise a single processor, multiple processors, or a system of processors.

The communications unit 104b of the vehicle 104 may include network interfaces for one or more of a plurality of different networks, protocols, or the like. For instance, the communications unit 104b may include one or more antennas (e.g., many in/many out (MIMO) antennas, etc.) that may allow for communication via Wi-Fi networks, IrDA, Bluetooth, Wireless USB, Z-Wave, ZigBee, near field communication (NFC), LTE, WiMAX, UMTS, CDMA, C-V2X, GSM interfaces may include Wi-Fi, xth generation cellular technology (e.g., 2G, 3G, 4G, 5G, etc.), WCDMA, LTE Advanced, or the like.

The electronic control unit 104a is configured to implement one or more autonomous and/or semi-autonomous systems such as a trained autonomous control model that is trained to generate motion trajectory and/or control commands for controlling the operation and navigation of the vehicle 104.

Figure 2:
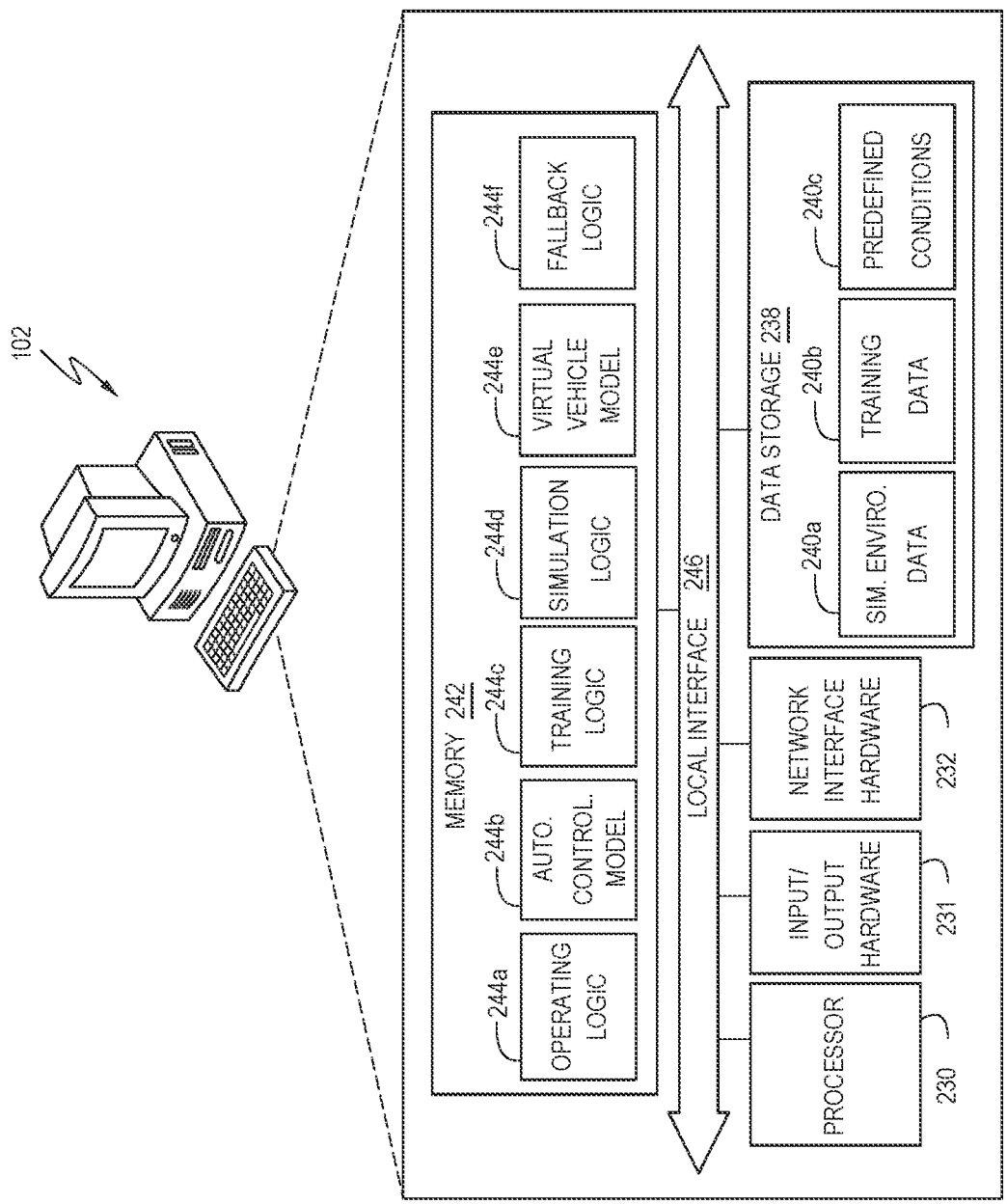
FIG. 2 schematically depicts an illustrative computing device, according to one or more embodiments shown and described herein.

FIG. 2 depicts an illustrative computing device 102. The computing device 102 may utilize hardware, software, and/or firmware, according to embodiments shown and described herein. While in some embodiments, the computing device 102 may be configured as a general-purpose computer with the requisite hardware, software, and/or firmware, in some embodiments, the server 103 may be configured as a special purpose computer designed specifically for performing the functionality described herein.

As illustrated in FIG. 2, the computing device 102 includes a processor 230, input/output hardware 231, network interface hardware 232, a data storage component 238, and a memory component 242.

The data storage component 238 stores simulation environment data 240a, training data 240b, and predefined conditions 240c. The simulation environment data 240a includes information such as a predefined dataset defining a virtual environment. Such data may include map data and input information such as camera data and parameters defining aspects of the simulated environment which operate as sensor inputs. The simulation environment data 240a is utilized by the computing device 102 to create instances of a simulated environment for performing a simulation. The data storage component 238 further includes training data 240b that includes data corpus of situations, optionally labeled, for training and/or refining a trained autonomous control model 244b. The training data 240b may be searchable based on events and/or situations such that select sets of the data corpus may be extracted for refining the trained autonomous control model 244b. In embodiments, the training data 240b may be generated from recordings of real-world driving events that are examples of ideal maneuvers and driving behaviors for particular driving environments and situations.

Additionally, the predefined conditions 240c stored in the data storage component may include rules and/or parameters that are used to determine whether a motion trajectory and/or control commands carried out by a virtual vehicle in a simulation results in good performance. Examples of the predefined conditions 240c include staying in a lane of travel, maintaining a gap distance, avoiding a collision with an object in the virtual driving environment, a rule of a road, a vehicle maneuver that exceeds a specified operating function of the virtual vehicle, and/or the like. These are only a few examples or predefined conditions 240c that may be applied by the fallback layer and/or other modules executed by the simulator to determine whether the trained autonomous control model 244b causes the virtual vehicle to operate with good performance. In embodiments, the data storage component 238 may include additional data sets utilized by the system 100.

The memory component 242 includes operating logic 244a, an autonomous control model 244b, training logic 244c, simulation logic 244d, one or more virtual vehicle models 244e, and fallback logic 244f (each of which may be embodied as a computer program, firmware, or hardware, as an example). The machine-readable memory (which may also be referred to as a non-transitory processor readable memory or medium) stores instructions which, when executed by the processor 230, causes the processor 230 to perform a method or control scheme as described herein. The memory component 242 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components.

Additionally, a local interface 246 is also included in FIG. 2 and may be implemented as a bus or other interface to facilitate communication among the components of the computing device 102.

The processor 230 may include any processing component(s) configured to receive and execute programming instructions (such as from the data storage component 238 and/or the memory component 242). The instructions may be in the form of a machine-readable instruction set stored in the data storage component 238 and/or the memory component 242. The input/output hardware 231 may include a monitor, keyboard, mouse, printer, microphone, speaker, and/or other device for receiving, sending, and/or presenting data. The network interface hardware 232 may include any wired or wireless networking hardware, such as a modem, LAN port, Wi-Fi card, WiMax card, mobile communications hardware, and/or other hardware for communicating with other networks and/or devices.

It should be understood that the data storage component 238 may reside local to and/or remote from the computing device 102 and may be configured to store one or more pieces of data for access by the computing device 102 and/or other components. As illustrated in FIG. 2, the data storage component 238 includes simulation environment data 240a, training data 240b, and predefined conditions 240c.

As noted above, the memory component 242 includes operating logic 244a, an autonomous control model 244b, training logic 244c, simulation logic 244d, one or more virtual vehicle models 244e, and fallback logic 244f (each of which may be embodied as a computer program, firmware, or hardware, as an example). Various operations and functionality of the operating logic 244a, an autonomous control model 244b, training logic 244c, simulation logic 244d, one or more virtual vehicle models 244e, and fallback logic 244f will be described in more detail with reference to FIGS. 3-4. Operating logic 244a includes rules, processes, and/or parameters that enable basic functionality of the computing device. The operating logic 244a may include operating system type functions that enable the implementation of other systems and processes. The autonomous control model 244b may be a machine-learning model that is trained to generate motion trajectories based on input information such as signals from sensors of a vehicle (e.g., a virtual vehicle model 244e) implemented by an autonomous and/or semi-autonomous system. In some embodiments, the autonomous control model 244b is trained to generate control commands for controlling one or more components of the vehicle such as a virtual vehicle implemented by a virtual vehicle model 244e.

The autonomous control model 244b may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tan h function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof.

In some embodiments, a convolutional neural network (CNN) may be utilized. For example, a convolutional neural network (CNN) may be used as an ANN that, in a field of machine learning, for example, is a class of deep, feed-forward ANNs applied for audio-visual analysis of the captured disturbances. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

The training logic 244c enables the computing device 102 to train and/or refine the autonomous control model 244b. The training logic 244c may be configured to implement one or more known training process for training a machine-learning model such as the autonomous control model 244b. The simulation logic 244d includes processes that when executed by the computing device 102 implement a simulation environment, generate instances of a virtual vehicle based on a virtual vehicle model 244e in the simulation environment, and cause inputs to be generated from simulation environment data 240a (also referred to herein as a predefined dataset). The simulation logic 244d further causes iterations of simulations of a trained autonomous control model 244b to be performed. As described herein, simulations of the trained autonomous control model 244b may include a fallback layer that receives a motion trajectory and/or control commands generated by the trained autonomous control model 244b. The fallback layer may be implemented by the fallback logic 244f executed by the computing device 102 to evaluate the performance of the trained autonomous control model 244b for a virtual vehicle defined by the virtual vehicle model 244e. The virtual vehicle model 244e is a computer based model of real-world vehicle. The virtual vehicle model 244e may define sensors, controllable components and parameters of the vehicle, as well as specified operating function such as a maximum turning angle, speed, braking values under specified road conditions, and/or the like.

Figure 3:
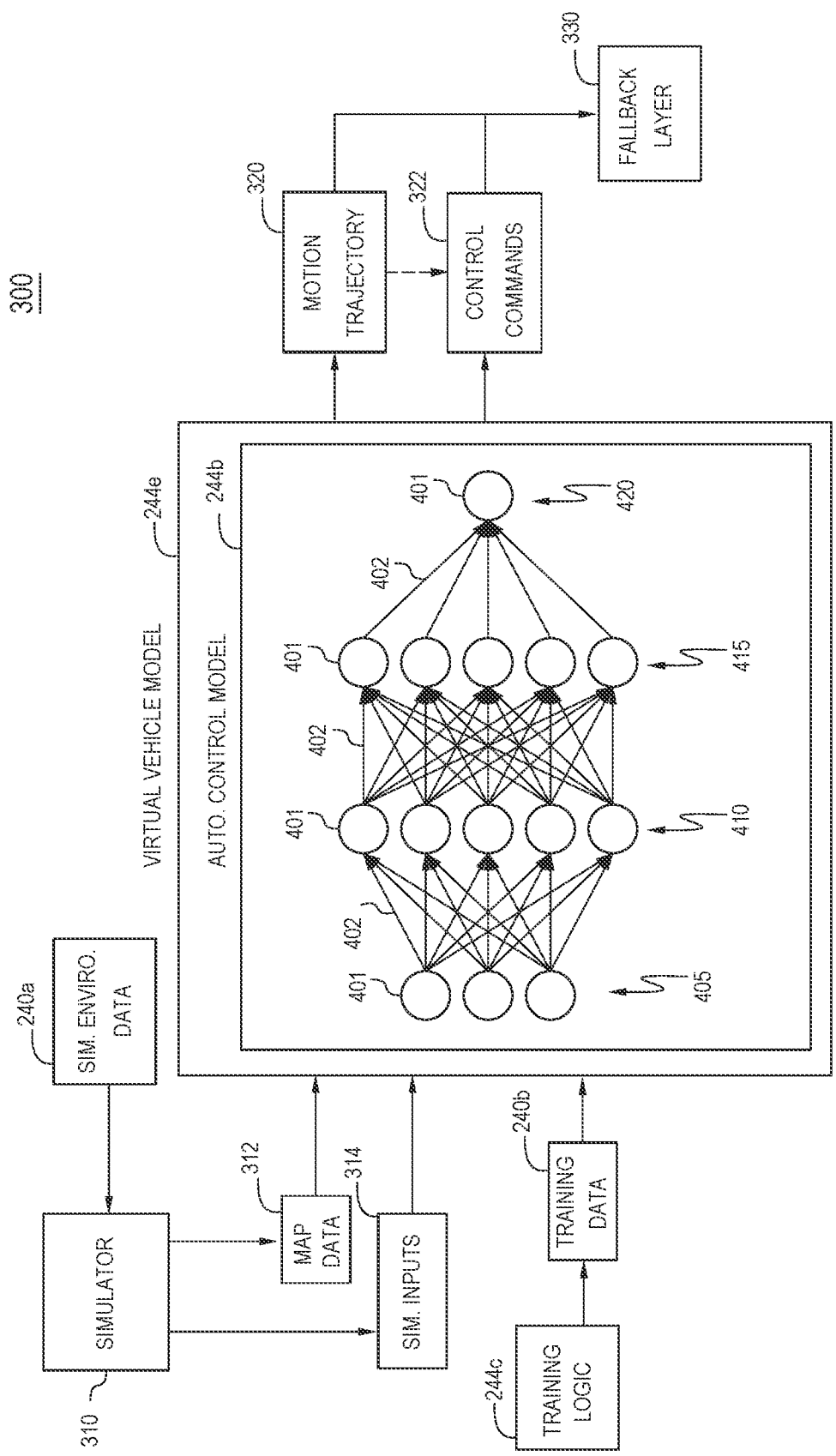
FIG. 3 depicts an illustrative block diagram of an illustrative implementation a system for simulating a trained autonomous control model and refining the trained autonomous control model, according to one or more embodiments shown and described herein.

Referring now to FIG. 3, a block diagram 300 of a simulation system for simulating a trained autonomous control model 244b is depicted. In some embodiments, a computing device 102 is configured to implement a simulation system. The block diagram 300 depicts the interconnection of dataset and models within a simulation environment. In embodiments, a simulator 310 is initiated by the computing device 102. The simulator 310 receives simulation environment data 240a. The simulator 310, when executed by the computing device 102, implements an instance of a virtual vehicle based on a virtual vehicle model 244e. The virtual vehicle includes a trained autonomous control model 244b. The trained autonomous control model 244b is a machine-learning model trained to autonomously or semi-autonomously control components of the virtual vehicle. For example, the trained autonomous control model 244*b* may be configured to generate one or more motion trajectories 320 based and/or control commands 322 that may navigate a vehicle (e.g., a virtual vehicle) through an environment (e.g., a simulation environment).

When the computing device 102 executes a simulation, the simulator 310 generates inputs, for example, map data 312 and/or simulated sensor signal inputs 314 based on simulation environment data 240*a*. The simulation environment data 240*a* includes predefined datasets defining one or more virtual driving environments. The inputs may be a time-series set of signals. The inputs may represent a particular driving event such as navigating an intersection, entering or exiting a highway, making a lane change, navigating a construction zone or traffic environment, or the like. A first set of inputs may initiate the operation of a virtual vehicle and subsequent series of inputs may be generated based on the virtual vehicle's maneuvers within the simulation environment. Moreover, the input signals may correspond to sensors of a vehicle. That is, the input signals may correspond to sensors of a vehicle.

The instance of the virtual vehicle under simulation implements a trained autonomous control model 244*b*. The trained autonomous control model 244*b* receives the inputs including, for example but not limited to, map data 312 and/or simulated sensor signal inputs 314. In some embodiments, the trained autonomous control model 244*b* is a neural network. The neural network may include one or more layers 405, 410, 415, 420, having one or more nodes 401, connected by node connections 402. The one or more layers 405, 410, 415, 420 may include an input layer 405, one or more hidden layers 410, 415, and an output layer 420. The input layer 405 represent the raw information that is fed into the neural network. For example, signals corresponding to map data 312 and/or simulated sensor signal inputs 314 or training data 240*b* generated by training logic 244*c* from a data storage component 238 may be input into the neural network at the input layer 405. The neural network processes the raw information received at the input layer 405 through nodes 401 and node connections 402. The one or more hidden layers 410, 415 depending on the inputs from the input layer 405 and the weights on the node connections 402 carry out computational activities. In other words, the hidden layers 410, 415 perform computations and transfer information from the input layer 405 to the output layer 420 through their associated nodes 401 and node connections 402.

In general, when a neural network is learning, the neural network is identifying and determining patterns within the raw information received at the input layer 405. In response, one or more parameters, for example, weights associated to node connections 402 between nodes 401, may be adjusted through a process known as back-propagation. It should be understood that there are various processes in which learning may occur, however, two general learning processes include associative mapping and regularity detection. Associative mapping refers to a learning process where a neural network learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks possess knowledge which is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0). In such networks, the weights are fixed a priori according to the problem to solve; and 2) adaptive networks which are able to change their weights (i.e., dW/dt not=0).

In order to train a neural network to perform some task, adjustments to the weights is made in such a way that the error between the desired output and the actual output is reduced. This process may require that the neural network compute the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network, hence "back propagation". Once the EA has been computed for a unit, it is straight forward to compute the EW for each incoming connection of the unit. The EW is the product of the EA and the activity through the incoming connection. It should be understood that this is only one method in which a neural network is trained to perform a task.

Referring back to FIG. 4, the neural network may include one or more hidden layers 410, 415 that feed into one or more nodes 401 of an output layer 420. There may be one or more output layers 420 depending on the particular output the neural network if configured to generate. For example, the neural network is trained to output one or more motion trajectories 320 and/or control commands 322. In some embodiments, the one or more motion trajectories 320 may be processed by the computing device 102 to generate control commands 322 that implement the one or more motion trajectories 320 planned by the trained autonomous control model 244*b*. For example, a motion trajectory 320 may be a path or route that is predicted and/or planned for execution by the virtual vehicle based on the simulation environment. For example, the motion trajectory 320 may include predicted path for navigating an environment based on a present set of signal inputs received by the trained autonomous control model 244*b* of the virtual vehicle.

A feature of the present embodiments is that when the trained autonomous control model 244*b* is simulated, the generated one or more motion trajectories 320 and/or control commands 322 are fed into a fallback layer 330 (e.g., a fallback system implemented by the computing device 102). Functions of the fallback layer 330 are described in more detail herein with respect to FIG. 4. In general, the fallback layer 330 is configured to detect when the trained autonomous control model 244*b* fails under simulation. For example, the fallback layer 330 determines whether the motion trajectory 320 and/or the control commands 322, when implemented by the virtual vehicle within the simulation environment, fail to meet one or more predefined conditions. The one or more predefined conditions may include, but are not limited to, determining that the vehicle stays in a lane of travel, maintains a gap distance, avoids a collision with an object in the virtual driving environment, obeys a rule of a road, or that a vehicle maneuver does not exceed a specified operating function of the virtual vehicle, or the like.

When the fallback layer 330 detects the failure of the trained autonomous control model 244b under simulation, the computing device 102 is further configured to identify an event in the simulation environment corresponding to the failure of the trained autonomous control model 244b, select additional training data 240b from a data corpus where the additional training data is analogous to the event, and execute a training process to refine the trained autonomous control model 244b using the additional training data such that the trained autonomous control model 244b learns to handle the event with fewer failures.

Figure 4:
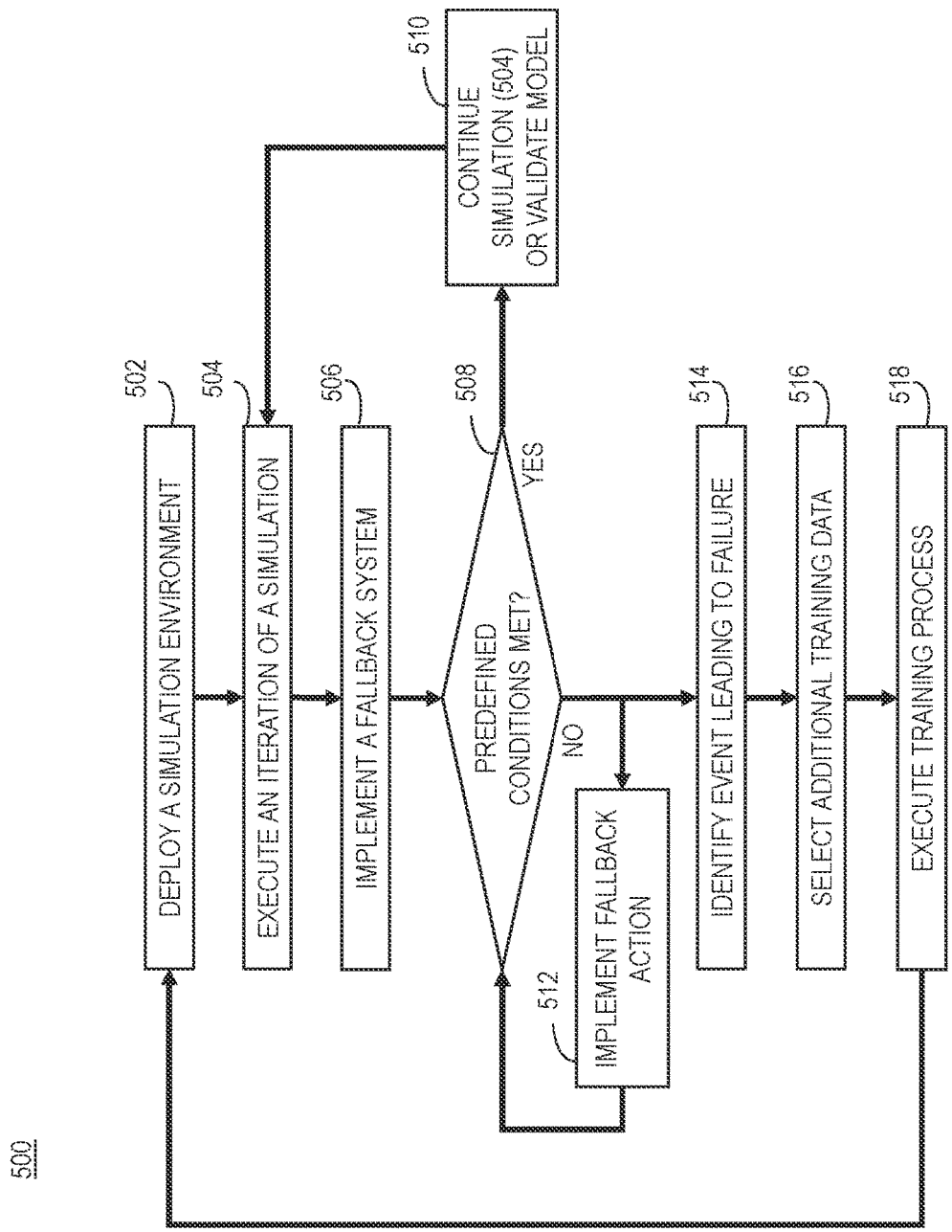
FIG. 4 depicts a flow chart of an illustrative method for simulating a trained autonomous control model and refining the trained autonomous control model, according to one or more embodiments shown and described herein.

Turning to FIG. 4 a flow chart 500 of an illustrative method for simulating a trained autonomous control model 244b and refining the trained autonomous control model 244b to improve performance under low performing situations is depicted. At block 502, the computing device 102 implements simulation logic 244d and a virtual vehicle model 244e. Implementation of the simulation logic 244d causes a simulation environment to be deployed that initiates an instance of a virtual vehicle based on the virtual vehicle model 244e. The virtual vehicle deploys a trained autonomous control model 244b for purposes of simulating the operation of the trained autonomous control model 244b based on predefined dataset defining a virtual driving environment. The simulator 310 generates inputs to the trained autonomous control model 244b and the trained autonomous control model 244b processes the inputs generating one or more outputs. The outputs may include one or more motion trajectories 320 and/or control commands 322. At block 506, the computing device 102 implements a fallback layer 330 in response to executing fallback logic 244f. The fallback layer 330 may be implemented as layer in a simulation model or as a separate system for post processing outputs generated by the trained autonomous control model 244b. In either instance, the fallback layer 330 is configured to determine whether the outputs fail to meet one or more predefined conditions 240c.

At block 508, the computing device 102, with the fallback layer 330 whether the trained autonomous control model 244b fails to meet one or more predefined conditions 240c. If the fallback layer 330 determines at block 508 that the output of the trained autonomous control model 244b meet the one or more predefined conditions 240c, "YES" at block 508, the method continues to block 510. At block 510, the computing device 102 may cause the simulation to continue executing iterations of the simulation at block 504 or complete validation of the model.

If the fallback layer 330 determines at block 508 that the output of the trained autonomous control model 244b fails meet the one or more predefined conditions 240c, "NO" at block 508, the method continues to block 512 and/or block 514. In embodiments, at block 512, the fallback layer 330 may determine and implement a fallback action. The fallback action may include, for example but not limited to, a stop operation, an evasive maneuver, a lane centering operation, or an adjustment to the motion trajectory for implementation by the virtual vehicle. The fallback action may further be evaluated by the fallback layer at block 508 to determine whether it meets the one or more predefined conditions 240c. In embodiments, if a fallback action is determined to meet the one or more predefined conditions 240c, the fallback action may be utilized to update the trained autonomous control model 244b such that the trained autonomous control model 244b may implement such an action or a similar action when it encounters similar situations in the future.

Whether or not the method proceeds to block 512 in response to a "NO" determination at block 508, the method can proceed to block 514. At block 514, the fallback layer 330 identifies an event in the simulation environment corresponding to the failure of the trained autonomous control model 244b. The process of identifying the event may include capturing and/or flagging the series of inputs provided by the simulator to the trained autonomous control model 244b during a previous iteration or instance of the simulation of the trained autonomous control model 244b. In some embodiments, the inputs, for example, that correspond to the identified event may be labeled. For example, the label may indicate a situation such as navigating an intersection, changing lanes, passing a slower moving vehicle, avoiding an obstacle, or the like.

At block 516, the computing device 102 executes a search, for example, of a data corpus for additional training data that is analogous to the identified event. The additional training data may be data collected from real-world driving operations, which may have been performed by a human driver. The computing device 102 may execute a search of a data corpus stored on a server 103. The additional training data may include a plurality of variations on the situation and responses to the situation such that they may be used to diversify and refine the training of the trained autonomous control model 244b. At block 518, the computing device 102 executes a training process to refine the trained autonomous control model 244b using the additional training data such that the trained autonomous control model 244b learns to handle the identified event with fewer failures. As referred to herein, "fewer failures" means that the trained autonomous control model 244b is capable of generating a motion trajectory 320 and/or control commands 322 that meet the one or more predefined conditions 240c. Once a refined training process is completed at block 518, the method returns to block 502 where the refined trained autonomous control model 244b is simulated in a subsequent iteration of a simulation.

In embodiments, the method may be implemented by a computing device 102 as described herein. Additionally, it should be understood that while reference is made to the trained autonomous control model 244b being implemented by a vehicle, autonomous control models are implemented by other devices and systems and embodiments described herein may be used to refine trained autonomous control model 244b for use in devices and systems other than a vehicle.

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that the systems, methods, and non-transitory mediums (computer program products) described herein relate to techniques for refining a trained autonomous control model utilizing simulations to validate the performance of the trained autonomous control model and execute additional training processes for the trained autonomous control model based on the simulated performance.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for refining a trained autonomous control model, the system comprising:
    a computing device configured to:
        execute a simulation of a trained autonomous control model for a vehicle model in a simulation environment based on a predefined dataset defining a virtual driving environment;
        implement a fallback layer configured to detect a failure of the trained autonomous control model under simulation; and
        in response to the fallback layer detecting the failure of the trained autonomous control model under simulation:
            identify an event in the simulation environment corresponding to the failure of the trained autonomous control model,
            select additional training data from a data corpus, the additional training data is analogous to the event, and
            execute a training process to refine the trained autonomous control model using the additional training data such that the trained autonomous control model learns to handle the event with fewer failures.

2. The system of claim 1, wherein executing the simulation feeds inputs generated from the predefined dataset defining the virtual driving environment into the trained autonomous control model for the vehicle model.

3. The system of claim 1, wherein the trained autonomous control model generates a motion trajectory for an instance of a virtual vehicle in the simulation in response to inputs to the trained autonomous control model based on the predefined dataset.

4. The system of claim 3, wherein the fallback layer is configured to:
    receive the motion trajectory from the trained autonomous control model, and
    determine whether the motion trajectory, when implemented by the vehicle model within the simulation environment, fails to meet one or more predefined conditions.

5. The system of claim 4, wherein the one or more predefined conditions includes at least one of:
    staying in a lane of travel,
    maintaining a gap distance,
    avoiding a collision with an object in the virtual driving environment,
    a rule of a road, or
    a vehicle maneuver that exceeds a specified operating function of the virtual vehicle.

6. The system of claim 4 wherein the fallback layer is further configured to:
    in response to determining that the motion trajectory fails to meet the one or more predefined conditions, implement a fallback action.

7. The system of claim 6, wherein the fallback action includes at least one of:
    a stop operation,
    an evasive maneuver,
    a lane centering operation, or
    an adjustment to the motion trajectory.

8. The system of claim 1, wherein the trained autonomous control model generates one or more control commands for controlling one or more components of a vehicle defined by a virtual vehicle in response to inputs to the trained autonomous control model based on the predefined dataset.

9. A method for refining a trained autonomous control model, the method comprising:
    executing, with a computing device, a simulation of a trained autonomous control model for a vehicle model in a simulation environment based on a predefined dataset defining a virtual driving environment;
    implementing, with the computing device, a fallback layer configured to detect a failure of the trained autonomous control model under simulation; and
    in response to the fallback layer detecting the failure of the trained autonomous control model under simulation:

identifying an event in the simulation environment corresponding to the failure of the trained autonomous control model, selecting additional training data from a data corpus, the additional training data is analogous to the event, and executing a training process to refine the trained autonomous control model using the additional training data such that the trained autonomous control model learns to handle the event with fewer failures.

10. The method of claim 9, wherein executing the simulation feeds inputs generated from the predefined dataset defining the virtual driving environment into the trained autonomous control model for the vehicle model.

11. The method of claim 9, wherein the trained autonomous control model generates a motion trajectory for an instance of a virtual vehicle in the simulation in response to inputs to the trained autonomous control model based on the predefined dataset.

12. The method of claim 11, wherein the fallback layer is configured to:

receive the motion trajectory from the trained autonomous control model, and determine whether the motion trajectory, when implemented by the vehicle model within the simulation environment, fails to meet one or more predefined conditions.

13. The method of claim 12, wherein the one or more predefined conditions includes at least one of:

staying in a lane of travel, maintaining a gap distance, avoiding a collision with an object in the virtual driving environment, a rule of a road, or a vehicle maneuver that exceeds a specified operating function of the virtual vehicle.

14. The method of claim 12 wherein the fallback layer is further configured to:

in response to determining that the motion trajectory fails to meet the one or more predefined conditions, implement a fallback action.

15. The method of claim 14, wherein the fallback action includes at least one of:

a stop operation, an evasive maneuver, a lane centering operation, or an adjustment to the motion trajectory.

16. The method of claim 9, wherein the trained autonomous control model generates one or more control commands for controlling one or more components of a vehicle defined by a virtual vehicle in response to inputs to the trained autonomous control model based on the predefined dataset.

17. A non-transitory computer-readable storage medium storing instructions that, when executed by a processor of a computing device, cause the computing device to:

execute a simulation of a trained autonomous control model for a vehicle model in a simulation environment based on a predefined dataset defining a virtual driving environment;

detect a failure of the trained autonomous control model under simulation; and in response to detecting the failure of the trained autonomous control model under simulation:

identify an event in the simulation environment corresponding to the failure of the trained autonomous control model, select additional training data from a data corpus, the additional training data is analogous to the event, and execute a training process to refine the trained autonomous control model using the additional training data such that the trained autonomous control model learns to handle the event with fewer failures.

18. The non-transitory computer-readable storage medium of claim 17, wherein the trained autonomous control model generates a motion trajectory for an instance of a virtual vehicle in the simulation in response to inputs to the trained autonomous control model based on the predefined dataset.

19. The non-transitory computer-readable storage medium of claim 18, wherein detecting the failure of the trained autonomous control model under simulation comprises:

determining whether the motion trajectory, when implemented by the vehicle model within the simulation environment, fails to meet one or more predefined conditions.

20. The non-transitory computer-readable storage medium of claim 19, storing instructions that further cause the computing device to:

in response to determining that the motion trajectory fails to meet the one or more predefined conditions, implement a fallback action.

* * * * *